(12) United States Patent
Sanpei et al.

(10) Patent No.: US 7,118,061 B2
(45) Date of Patent: Oct. 10, 2006

(54) TAPE REEL AND TAPE CARTRIDGE HAVING THE SAME

(75) Inventors: Takaaki Sanpei, Miyagi (JP); Shuichi Kikuchi, Miyagi (JP); Kazuo Sasaki, Miyagi (JP); Mitsue Sakurai, Miyagi (JP); Hitomi Chiba, Miyagi (JP)

(73) Assignee: Sony Corporation, Tokyo (JP)

( * ) Notice: Subject to any disclaimer, the term of this patent is extended or adjusted under 35 U.S.C. 154(b) by 276 days.

(21) Appl. No.: 10/472,126

(22) PCT Filed: Oct. 31, 2002

(86) PCT No.: PCT/JP02/11372

§ 371 (c)(1),
(2), (4) Date: Sep. 16, 2003

(87) PCT Pub. No.: WO03/038825

PCT Pub. Date: May 8, 2003

(65) Prior Publication Data

US 2004/0089756 A1    May 13, 2004

(30) Foreign Application Priority Data

| Nov. 1, 2001 | (JP) | P2001-337215 |
| Nov. 1, 2001 | (JP) | P2001-337216 |
| Jun. 24, 2002 | (JP) | P2002-183718 |
| Jul. 26, 2002 | (JP) | 2002-218558 |
| Oct. 4, 2002 | (JP) | P2002-292864 |

(51) Int. Cl.
*G11B 23/107* (2006.01)

(52) U.S. Cl. ........................ 242/348; 242/611; 360/132

(58) Field of Classification Search ................ 242/345, 242/348, 348.2, 611; 360/132
See application file for complete search history.

(56) References Cited

U.S. PATENT DOCUMENTS 6,869,037 B1 * 3/2005 Hiraguchi .................... 242/348

FOREIGN PATENT DOCUMENTS

| JP | 10-97779 | 4/1998 |
| JP | 10-222950 | 8/1998 |

* cited by examiner

*Primary Examiner*—John Q. Nguyen
(74) *Attorney, Agent, or Firm*—Frommer Lawrence & Haug LLP; William S. Frommer; Paul A. Levy

(57) ABSTRACT

A tape reel in which molding quality of a flange unit is improved so as to improve reliability at the time when a magnetic tape runs at high speed, and a tape cartridge having the same. A plurality of reference planes (152v) formed between a chucking gear (152b) and an outer peripheral rib (152r2) formed at an outer peripheral side of this chucking gear (152b) are provided separately from the outer peripheral rib (152r2). And the reference plane (152v) is formed with edge planes of each of a first rib (152v1) extending toward a circumference and a second rib (152v2) extending toward a direction crossing the first rib (152v1). According to this arrangement, a volume at a portion constituting the reference plane (152v) is made smaller, occurrence of a sink after a resin is hardened is suppressed, and molding quality of the flange unit (152) is improved so that straight runnability of the magnetic tape at high speed running and reliability in recording/reproducing operation are improved.

2 Claims, 18 Drawing Sheets

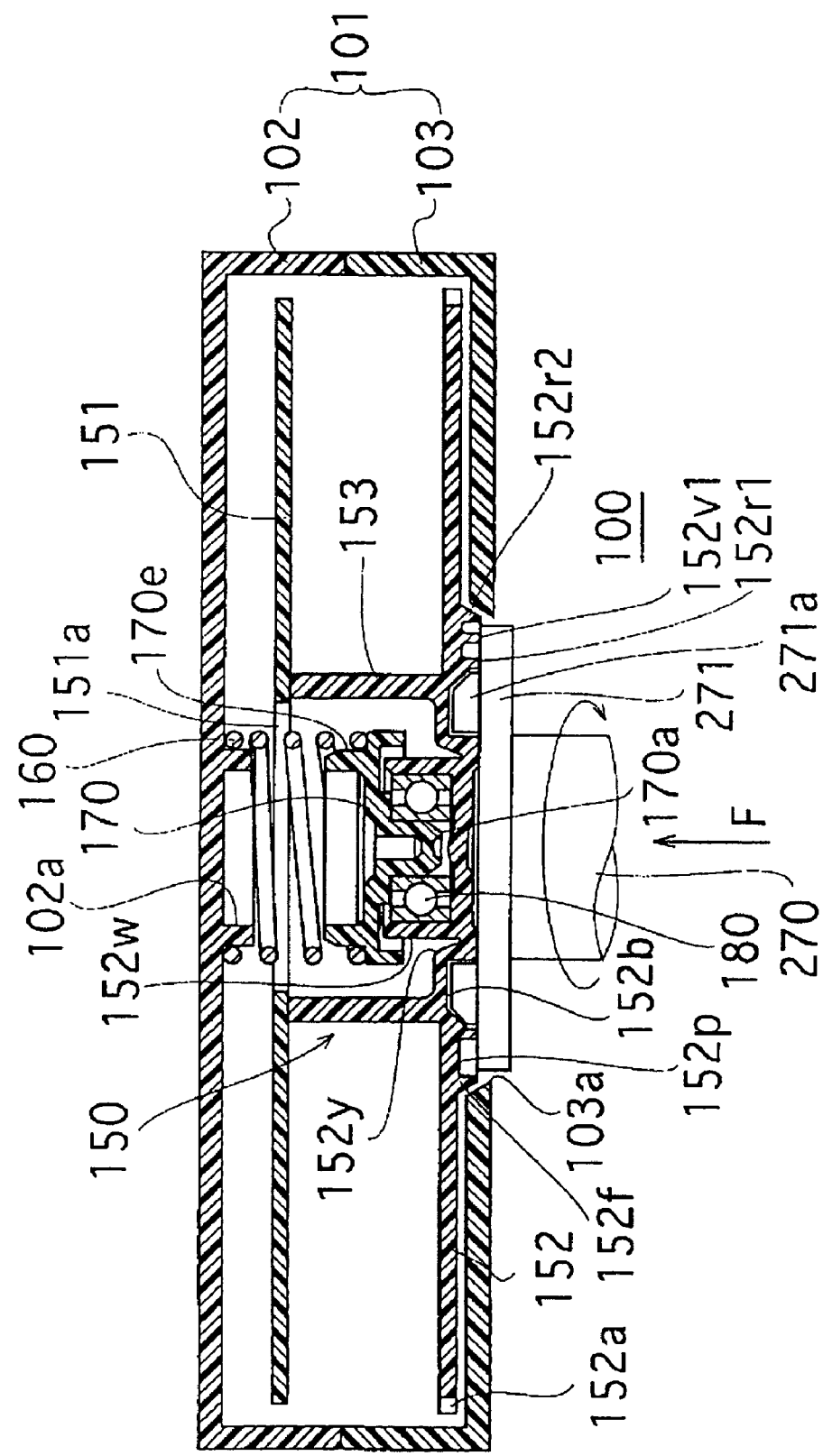

FLOW OF RESIN

FLOW OF RESIN

TAPE REEL AND TAPE CARTRIDGE HAVING THE SAME

TECHNICAL FIELD

The present invention relates to a tape cartridge in which a tape reel having a magnetic tape wound therearound is accommodated, in particular, to a tape reel with improved reliability during high speed running, and a tape cartridge having the tape reel therein.

BACKGROUND ART

A tape drive has been known, which records and reproduces information by taking out a magnetic tape being a recoding medium from a tape cartridge having therein a single reel around which the magnetic tape is wound. This kind of tape drive is widely used for backing up data for a system such as a computer server dealing with a huge amount of data.

Although there are various kinds of tape cartridges that have a single reel therein as described above, for example, there has been known the one in which a leader block connected to one end of the magnetic tape is disposed in a housing of the tape cartridge.

When the tape cartridge having the leader block is loaded in the tape drive, the leader block is chucked by a chucking mechanism, taken out by a transport mechanism, and conveyed to a take-up reel of the tape drive. The magnetic tape taken out from the tape cartridge is taken up by a take-up reel of the tape drive, and, simultaneously, the information is recorded on or reproduced from the magnetic tape by the magnetic head of the tape drive.

The tape reel to which the magnetic tape is wound conventionally comprises an upper flange unit and a lower flange unit which are disc-like and for guiding both sides of the magnetic tape, and a cylinder-like drum unit and to which the magnetic tape is wound. The drum unit is formed, for example, integrally with the lower flange unit.

FIG. 20 is a bottom view of a conventional tape reel 50 viewed from the side of a lower flange unit 52 thereof. A circular projection 52f is formed at a center portion of an under surface of the tape reel 50. The projection 52f has an outer peripheral portion 52r which engages with a circular opening formed on a lower shell of the tape cartridge. The outer peripheral portion 52r has at an inner portion thereof a ring-shaped chucking gear 52b engaged with a gear formed on the top of a rotary shaft of the tape drive side.

Between the outer peripheral portion 52r and the chucking gear 52b, three reference planes 52t supported by a reel support on the rotary shaft are provided on the same circumference at even angle intervals. Portions other than the reference planes 52t are to be voids 52p.

In the figure, a reference numeral 52a depicts a rotation regulation gear formed on a periphery of the lower flange unit 52.

As in the conventional example described above, there is, as a related art document, for example, the following patent document 1, which discloses a structure of a tape reel in which the reference plane 52t and the outer peripheral portion 52r are continuously formed.

Patent Document 1

Japanese Patent Application Publication Hei 10-241324 (FIG. 1)

By the way, such a tape cartridge as described above is mainly used when bulky and important data is stored and it is required to have high reliability in various viewpoints.

For example, in order to accelerate a series of operation in the tape drive, there are demands for operations at higher speed in taking out the leader block, forwarding the magnetic tape and rewinding the magnetic tape. On the other hand, at the same time, the tape cartridge is required to be tough so that breaking of the magnetic tape and damage on the tape edge are hardly occurs and to have a high reliability in recording/reproducing operation.

With regard to the tape reel which the magnetic tape is wound around, the tape reel is usually formed with an injection-molded body of a synthetic resin material. The mold quality largely affects on runnability of the magnetic tape and the reliability in recording/reproducing operation.

In particular, since the projection portion 52f of the lower flange unit 52, on which the chucking gear 52b, the reference plane 52t or the like are formed, has an extremely complicated shape, irregularity of a sink amount of the resin after molding on the lower flange unit 52 largely affect on the edge of the magnetic tape which is wound around the drum unit, which becomes a cause of deterioration in straight runnability of the tape at high speed and reliability in recording/reproducing operation.

Here, FIG. 21A is a view showing the projection portion 52f of the lower flange unit 52 in the conventional tape reel 50, and FIG. 21B is a schematic view showing a flow of the resin at a portion shown by a cross-sectional line SS1 in the reference plane 52t (FIG. 21A) at the time of molding.

As shown in FIG. 21A, three gate positions G1 are all provided in the voids 52p. Since the portions constituting the reference plane 52t are thicker and bulky than the other portions and, further, they are away from the gate positions, injection pressure is hardly applied thereto. Furthermore, the portion where the reference plane 52t is formed is a portion where a resin flown out from the other gate merges.

Accordingly, the resin is easily short at the portions constituting the reference plane 52t and a sink F1 easily occurs on the opposite side (a plane on which the tape is wound) of the reference plane 52t after hardening the resin, as shown in FIG. 21B.

Irregularity of the sink F1 largely relates to surface wobbling of the lower flange unit 52. The surface wobbling disturbs the straight runnability of the magnetic tape. The contact between the edge of the magnetic tape and the flange unit damages the edge of the magnetic tape. Thus, there occurs a problem that reliability in recording/reproducing operation of the data is deteriorated.

The present invention was made in view of the above-mentioned problem, and it is an object of the present invention to provide a tape reel in which a flange unit thereof is improved in its molding quality and whose reliability at the time when a magnetic tape is running at high speed is improved, and a tape cartridge having the tape reel.

DISCLOSURE OF INVENTION

Upon solving the above-described problem, the tape reel of the present invention is characterized in that a plurality of reference planes each formed between a chucking gear and an outer peripheral rib formed at an outer periphery side of the chucking gear are provided separately from the outer peripheral rib.

According to the present structure, the volume of the portion constituting the reference plane is reduced, the loss of the resin flowing at the time of injection molding is decreased and the resin is filled to all ends of the part shape, and occurrence of the sink after hardening of the resin is suppressed. According to this arrangement, the molding quality of the flange unit can be improved, and straight runnability at the time the magnetic tape is running at a high speed and reliability in recording/reproducing operation can be realized.

In addition, another tape reel of the present invention is characterized in that a gate position for injection molding is disposed inside the reference plane formed at an outer peripheral side of the chucking gear.

According to this structure, injection pressure is sufficiently applied to the portion constituting the reference plane, the sink of the resin at the time of hardening is reduced. According to this arrangement, the molding quality of the flange unit can be improved, and higher straight runnability at the time the magnetic tape is running at a high speed and higher reliability in recording/reproducing operation can be realized.

BRIEF DESCRIPTION OF DRAWINGS

FIG. 11 is a cross-sectional view showing a state that a rotary shaft is connected to the tape cartridge 100.

BEST MODE FOR CARRYING OUT THE INVENTION

Now, embodiments of the present invention will be described with reference to the attached drawings.

(First Embodiment)

Figure 1:
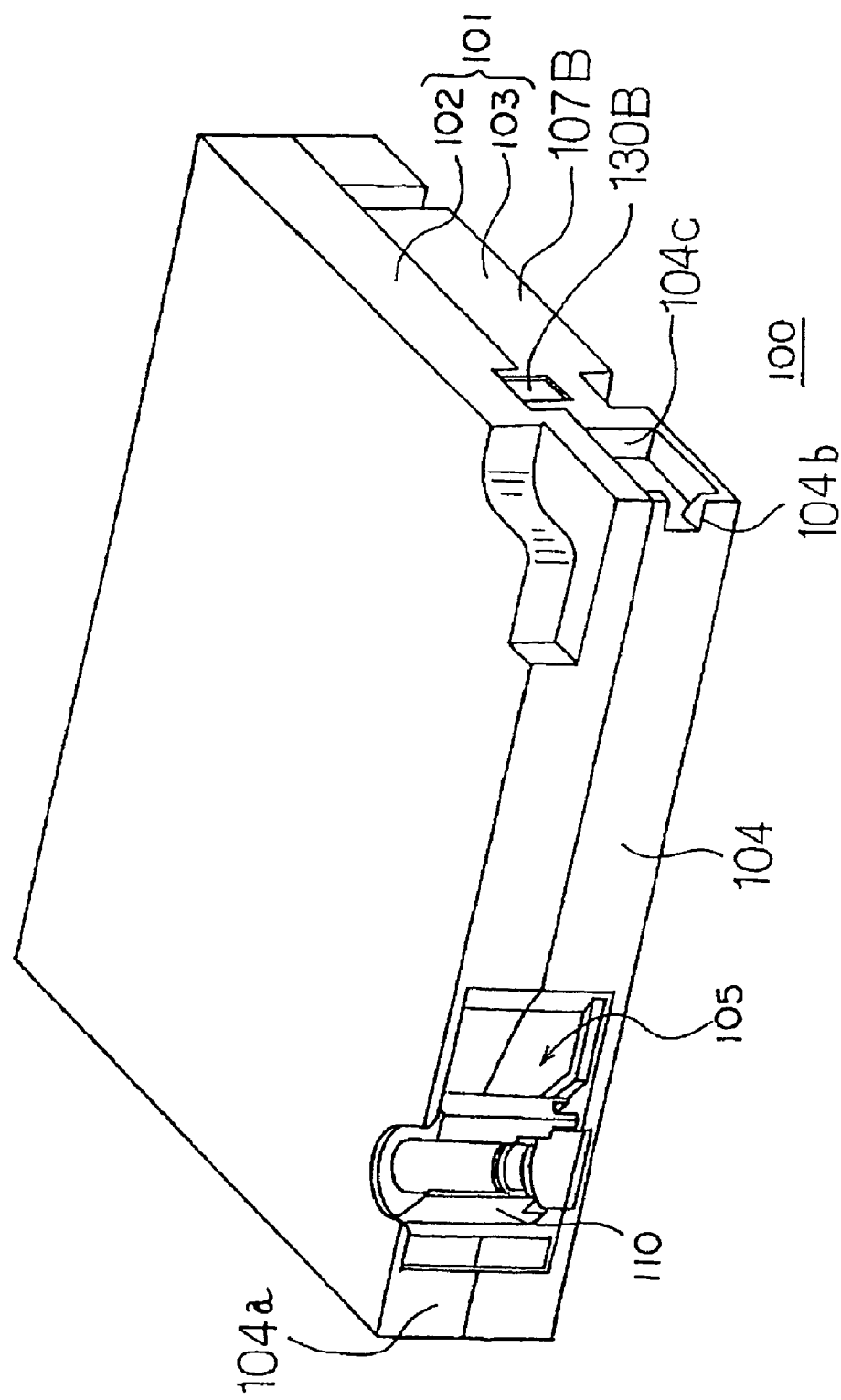
FIG. 1 is a perspective view of an external appearance of a tape cartridge according to an embodiment of the present invention.

FIG. 1 is a perspective view of an external appearance of a tape cartridge according to an embodiment of the present invention.

As shown in FIG. 1, a tape cartridge 100 of the present embodiment has a housing 101 in a substantially rectangular shape, comprising an upper shell 102 and a lower shell 103, and a leader block 110 disposed in the housing 101 and at an opening 105 formed on a front face 104 of the housing 101.

The upper shell 102 and the lower shell 103 are formed by injection molding a synthetic resin such as polycarbonate, for example.

In addition, the leader block 110 is connected to one end of a magnetic tape wound around the tape reel accommodated in the housing 101 but not shown in the figure, through a leader tape.

The front face 104 of the housing 101 on which the opening 105 is to be formed is an end for inserting the tape cartridge toward the tape drive, and an right end portion (the left side end portion in FIG. 1) adjacent to the opening 105 and a left end portion on the opposite side are formed to regulate (lock out) an erroneous insertion into a tape drive for the other format tape cartridge.

In other words, the right end portion is formed to be a flat plane 104a so that it has a lock out structure against a tape drive for a so-called LTO type tape cartridge, and the left end portion has a notch 104b communicating with a recess 104c concavely provided on a left side face 107B consecutively provided to the front face 104 and these notch 104b and recess 104c constitutes a lockout structure against a tape drive for a so-called DLT type cartridge.

Incidentally, the recess 104c is also used for positioning of the tape cartridge 100 in the tape drive for the tape cartridge 100.

Before explaining the specific structure of the above-mentioned tape cartridge 100, an example of a tape drive to which the tape cartridge 100 is loaded and which records data to and reproduces data from a magnetic tape wound around a tape reel accommodated in the tape cartridge 100 is explained with reference to FIG. 2 and FIG. 3.

Figure 2:
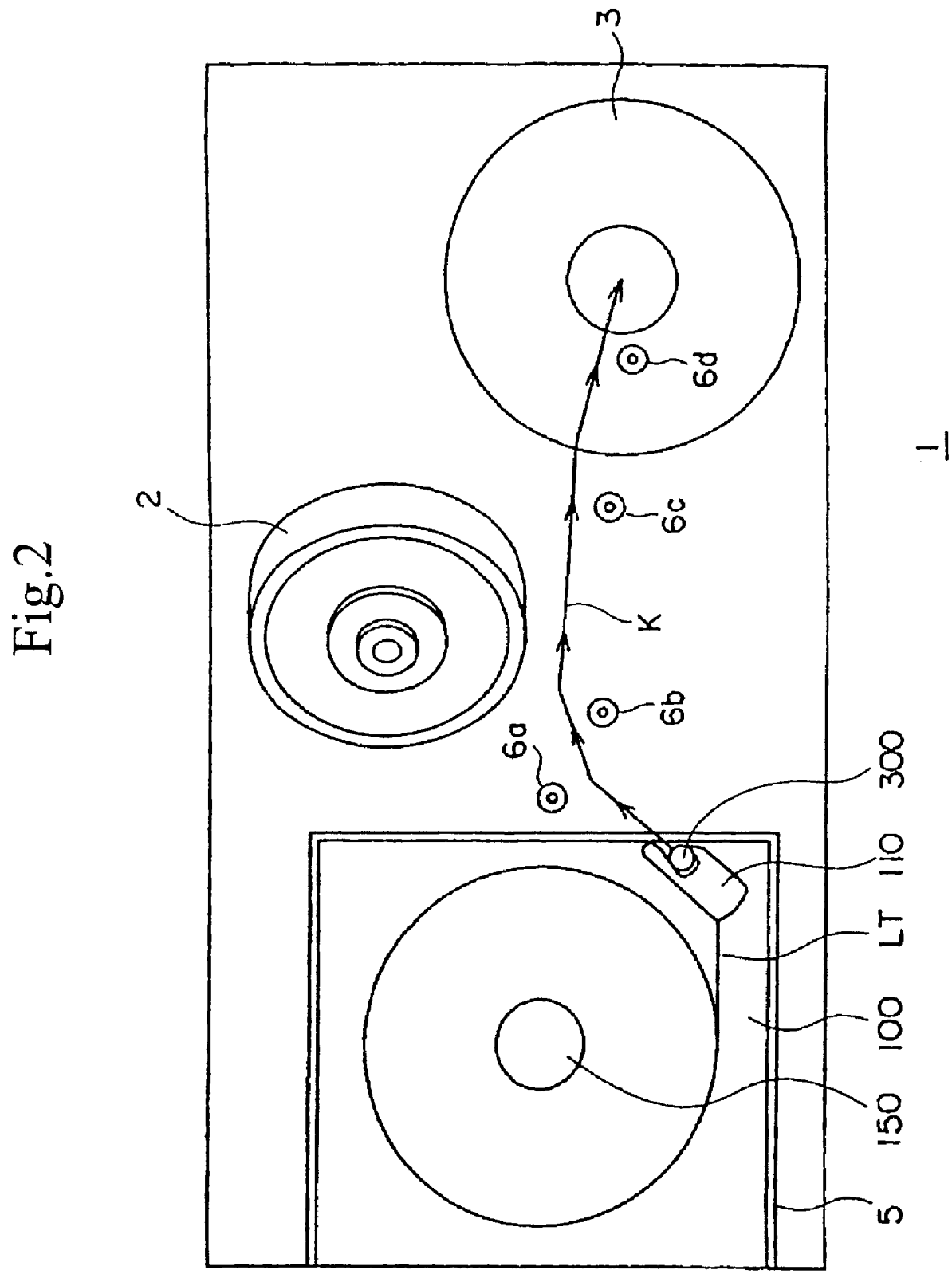
FIG. 2 is a plan view showing a schematic structure of a tape drive.

FIG. 2 is a plan view showing a schematic structure of a tape drive.

In FIG. 2, a tape drive 1 has a head drum 2, a take-up reel 3, a cartridge loader unit 5, a plurality of movable guides 6a–6d and a chucking mechanism 300.

The take-up reel 3 is rotationally driven by a not-shown drive motor, and takes up a leader tape LT wound around a tape reel 150 of the tape cartridge 100 loaded in the cartridge loader unit 5 and a magnetic tape connected to the leader tape LT.

The head drum 2 has a magnetic head for recording data to the magnetic tape and for reproducing data from the magnetic tape, and is rotated at a predetermined rotational frequency at the time of recording and reproducing. This head drum 2 performs recording and reproducing according to so-called helical scanning system.

The plurality of movable guides 6a–6d are provided so that they can be moved by a not-shown moving mechanism along a predetermined route, and they move to respective predetermined positions to regulate a running route of the magnetic tape taken out from the tape cartridge.

The chucking mechanism 300 chucks the leader block 110 of the tape cartridge 100. This chucking mechanism 300 is connected to a not-shown conveyance mechanism, and this conveyance mechanism conveys the chucking mechanism 300 toward the take-up reel 3 along a route K shown in FIG. 2. Accordingly, the leader block 110 chucked by the chucking mechanism 300 is conveyed toward the take-up reel 3 along the route K.

The reason why the leader block 110 is conveyed to the take-up reel 3 along the route K is to guide the magnetic tape taken out by the conveyance of the leader block 110 to the predetermined running route by the plurality of movable guides 6a–6d.

In other words, since the flexibility in the arrangement of the plurality of movable guide 6a–6d is limited due to the size of the tape drive 1 or the like, if the leader block 110 is not conveyed in correspondence with the positions of the plurality of the movable guides 6a–6d, the plurality of movable guides 6a–6d cannot guide the magnetic tape taken out in response to the movement of the leader block 110.

When the leader block 110 is conveyed to the take-up reel 3, the leader block 110 is held by a not-shown mechanism at a position where the take-up reel 3 is capable of taking up the leader tape LT and the magnetic tape.

Figure 3:
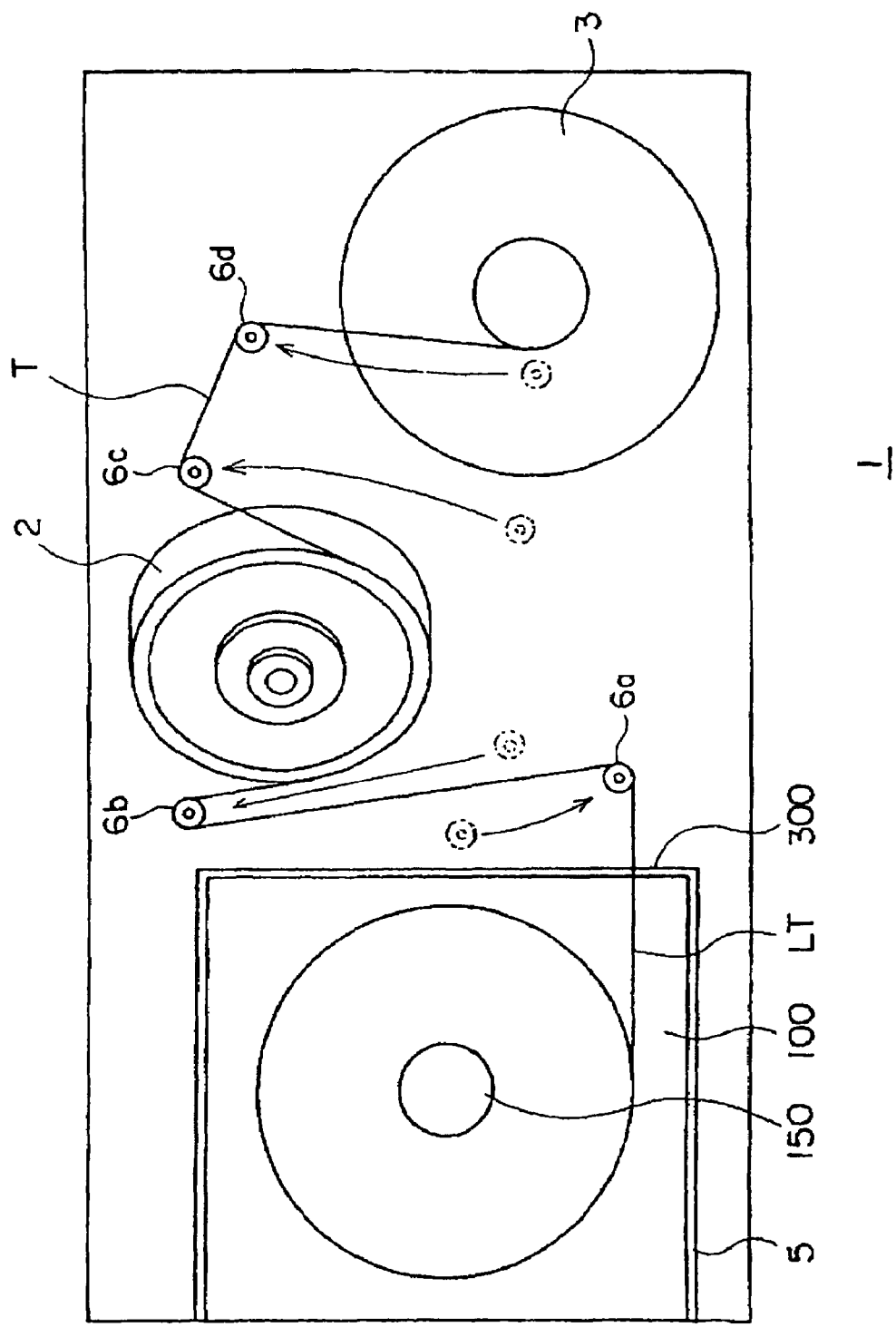
FIG. 3 is a view for explaining an operation after a leader block is taken out in the tape drive shown in FIG. 2.

Thereafter, as shown in FIG. 3, for example, the plurality of movable guides 6a–6d move to the respective predetermined positions and the magnetic tape T taken out from the tape cartridge 100 is guided to a predetermined running route and the magnetic tape T is wound around the head drum at a range substantially a half of the head drum 2. According to the operation, recording of data to the magnetic tape T or reproducing of data from the magnetic tape T is carried out.

Figure 4:
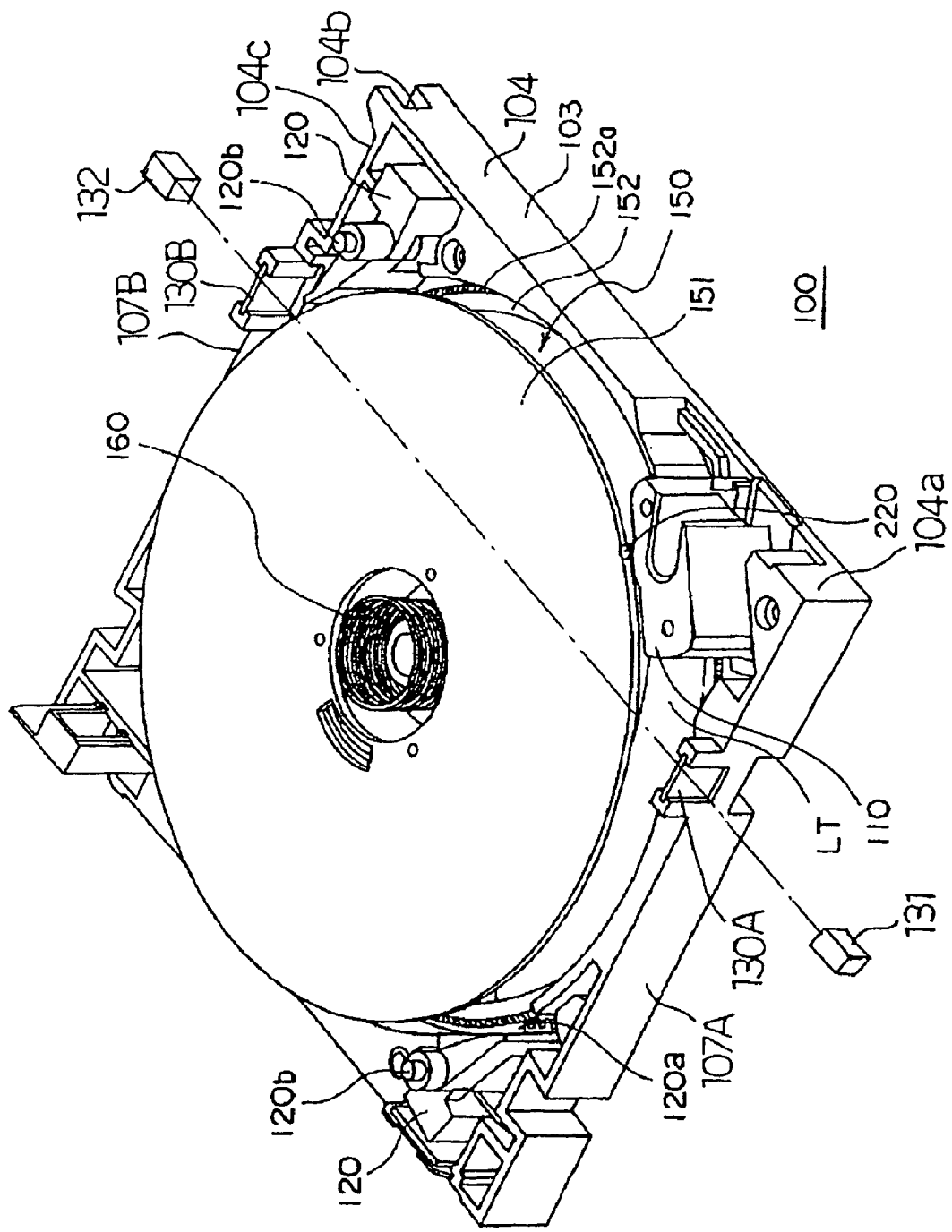
FIG. 4 is a perspective view in a condition that an upper shell 102 of a tape cartridge 100 is taken away.

FIG. 4 is a perspective view in a condition that the upper shell 102 of a tape cartridge 100 is taken away.

As shown in FIG. 4, the tape cartridge 100 has the leader block 110, the tape reel 150, a coil spring 160, a reel-locking member 120 and an anti-contact pin 220 in the housing thereof comprising the upper shell and the lower shell 103.

Each of a right side face 107A and the left side face 107B provided continuously to the front surface 104 of the tape cartridge 100 has a window member 130A and 130B, respectively, comprising an optically transparent material. Each of these window members 130A and 130B faces to a light emitting unit 131 and a light receiving unit 132, respectively, for detecting the tape end when taking up the magnetic tape around the take-up reel 3 of the tape drive 1 (FIG. 2).

An end of the magnetic tape wound around the tape reel 150 is wound around a drum unit 153 of the tape reel 150 (FIG. 5) via a transparent trailer tape. The trailer tape is fixed to the drum unit 153 by sticking a tape face to the circumferential surface of the drum unit 153 with alcohol or water. Accordingly, if taking up operation of the tape by the take-up reel 3 is not stopped before taking out of the tape from the tape reel 150 becomes impossible, the trailer tape comes off from the drum unit 153 and may introduce dysfunction of the tape cartridge.

Therefore, in the present embodiment, when a detecting light from the light emitting unit 131 comes inside the tape cartridge through one window member 130A and passes through the trailer tape to be received by the light receiving unit 132 after coming out from the other window member 130B, taking-up operation by the take-up reel 3 is stopped.

Figure 5:
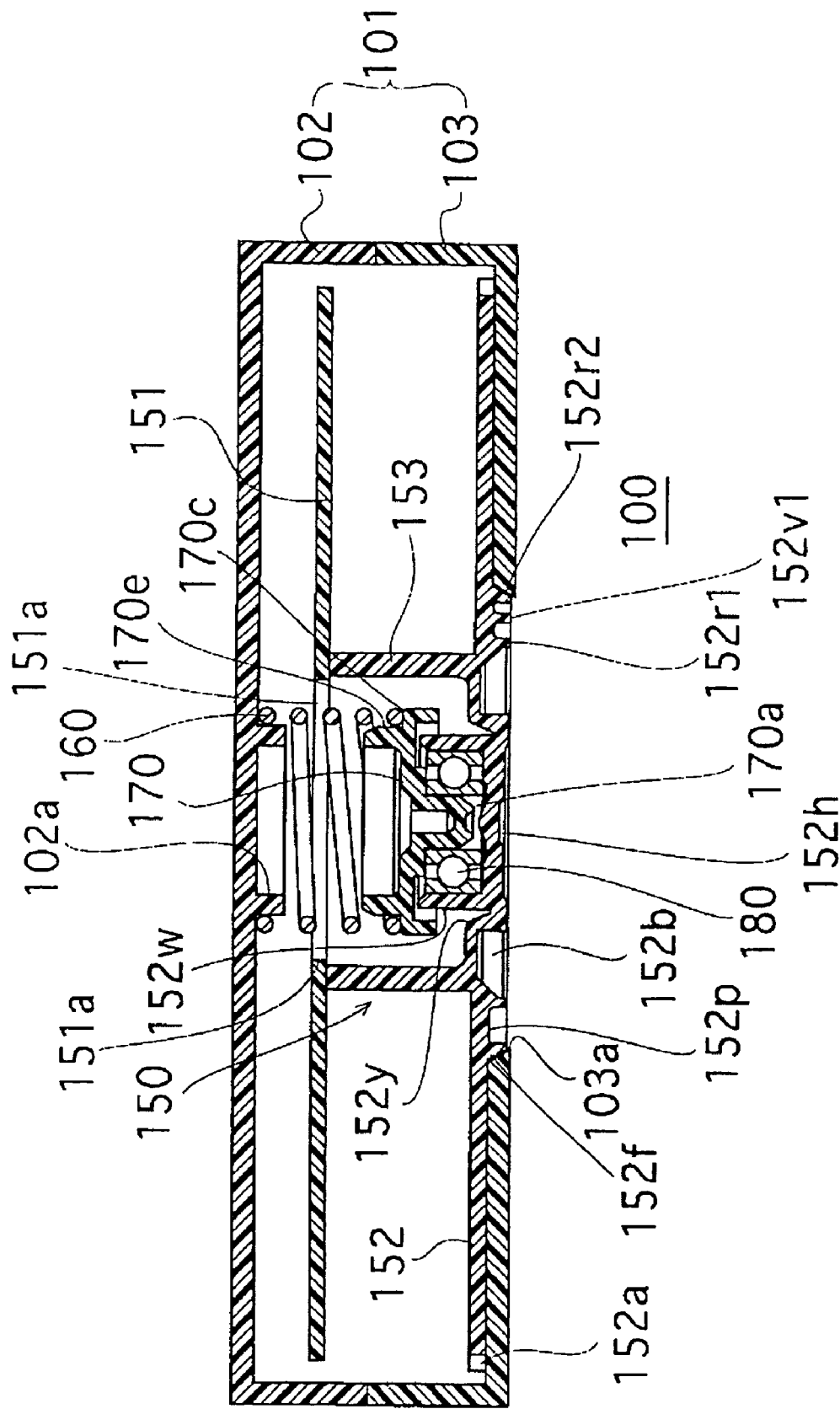
FIG. 5 is a cross-sectional view showing an inner structure of the tape cartridge 100.

FIG. 5 is a cross-sectional view showing an inner structure of the tape cartridge 100.

The tape reel 150 consists of a disc-like upper flange unit 151 disposed on the side of the upper shell 103, the cylinder-like drum unit 153, and a disc-like lower flange unit 152, as shown in FIG. 5.

The drum unit 153 and the lower flange unit 152 are integrally formed by injection molding, and the upper flange unit 151 is fixed to an upper end of the drum unit 152 by welding, for example.

At the center on a top surface of the lower flange unit 152 of the tape reel 150, a ring-like wall portion 152w is formed and an outer periphery of a ball bearing 180 is pressed into an inner periphery of the wall portion 152w.

In the inner periphery of the ball bearing 180, a shaft unit 170a formed on the lower end side of an engaging member 170 is pressed and fitted.

An insertion unit 170e of an upper end side of this engaging member 170 is inserted into the inner periphery of the coil spring 160.

The coil spring 160 is provided between the upper shell 103 and the engaging member 170 through the circular opening 151a of the upper flange unit 151 of the tape reel 150. The inner periphery of the upper end portion of the coil spring 160 engages with a ring-like rib 102a formed on the upper shell 102, and the lower end portion of the coil spring 160 is supported by the upper surface of a brim-like support unit 170c formed on the outer periphery of the engaging member 170.

This coil spring 160 urges the engaging member 170 toward the lower shell 103, and thus, the tape reel 150 is pressed onto the lower shell 103 by the coil spring 160.

When a chucking gear 152b formed on the lower flange unit 152 engages with a gear 271a formed on a support unit 271 of the rotary shaft 270 provided in the tape drive 1, as shown in FIG. 11, the coil spring 160 urges the lower flange unit 152 toward the gear 271a of the rotary shaft 270 so as to ensure the engagement between the chucking gear 152b and the gear 271a.

In addition, in accordance with the operation of rotary shaft 270 pressing the lower flange unit 152 in a direction of an arrow F (FIG. 11) against the urging force of the coil spring 160, the lower flange unit 152 ascends from a surface of the lower shell 103 and the tape reel 150 becomes freely rotatable.

Figure 6:
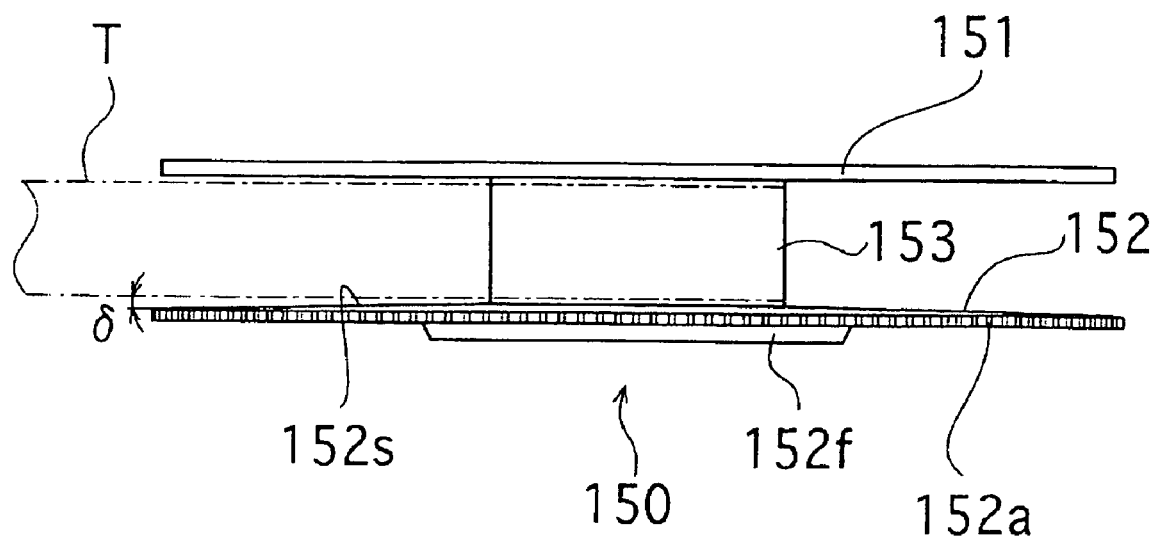
FIG. 6 is a front view of a tape reel 150.

FIG. 6 is a front view of a tape reel 150.

As shown in FIG. 6, in the tape reel 150, the magnetic tape T is wound around the outer periphery of the drum unit 153, and the upper flange unit 151 and the lower flange unit 152 guide both edges of the magnetic tape T.

In addition, at the outer periphery of the lower flange unit 152, there is formed a rotation-regulating gear 152a of the tape reel 150. This rotation-regulating gear 152a engages with gears 120a of the two reel locking members 120 shown in FIG. 4.

The reel-locking member 120 is, as shown in FIG. 4, provided on the lower shell 103 rotatably with a pivot 120b as a center, and the gear 120a is urged to engage with the rotation-regulating gear 152a by a not-shown torsion spring. Therefore, the tape reel 150 is usually in a condition that its rotation regulated. The gear 120a of the reel locking member 120 is released from the engagement with the rotation-regulating gear 152a when the tape cartridge 100 is loaded in the cartridge loader unit 5 of the tape drive 1.

As shown in FIG. 6, the interval between the upper flange unit 151 and the lower flange unit 152 are arranged to be slightly wider than the width of the magnetic tape T. Accordingly, when the magnetic tape T wound around the drum unit 152 of the tape reel 150 becomes loose, the magnetic tape T may be in a condition of being wound one-sidedly toward the upper flange unit 151 or the lower flange unit 152.

For example, when the magnetic tape T is taken out or taken up in the condition that the magnetic tape T is wound one-sidedly toward the lower flange unit 152 on the outer periphery of which the rotation-regulating gear 152a is formed, the magnetic tape T may come into contact with the rotation-regulating gear 152a and may be cut or damaged by the edge of the rotation-regulating gear 152a.

Therefore, in the present embodiment, a face 152s of the lower flange unit 152, facing toward the magnetic tape T, is tapered at an inclination angle of δ. According to this arrangement, the more the magnetic tape T goes toward the outer periphery of the lower flange unit 152, the more the contact between the magnetic tape T and the rotation-regulating gear 152a can be avoided and the damage and cut of the tape edge of the magnetic tape T can be avoided.

Figure 7:
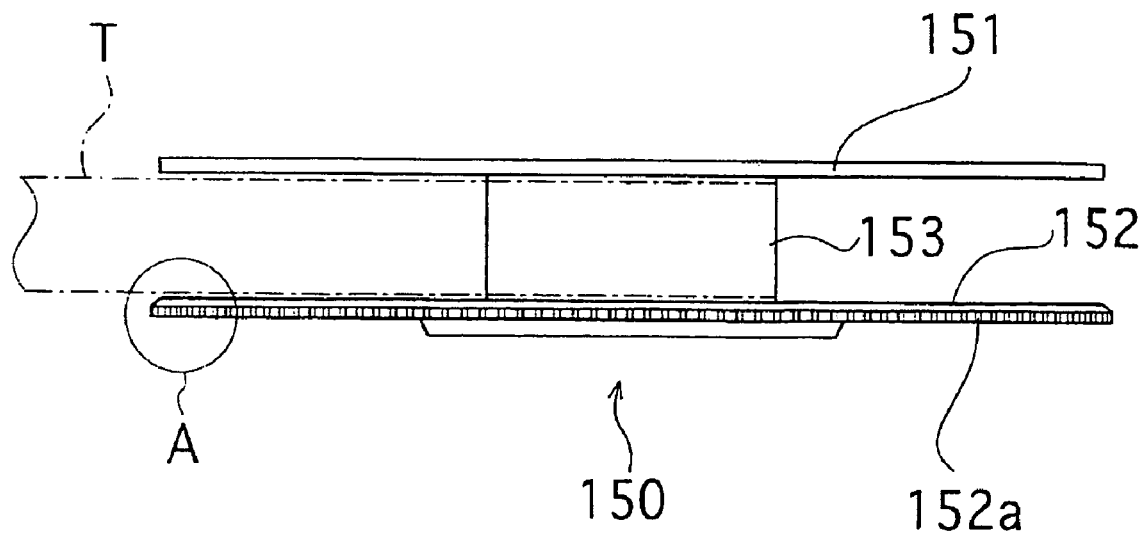
FIG. 7 is a front view showing another structural example of the tape reel 150.
Figure 8:
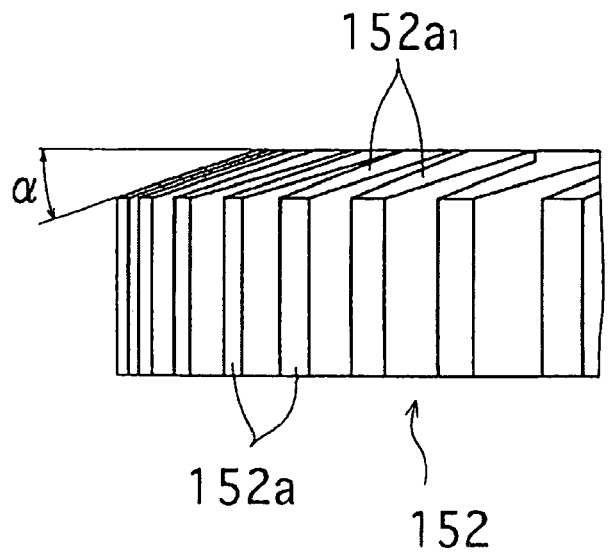
FIG. 8 is an enlarged view of a circle A in FIG. 7.

Another structural example of the lower flange unit 152 for avoiding the contact between the magnetic tape T and the rotation-preventing gear 152a is shown in FIG. 7 and FIG. 8. FIG. 7 is a front view of the tape reel 150, and FIG. 8 is an enlarged view of a circle A in FIG. 7.

As shown in FIG. 8, an end face 152a1 of the rotation-regulating gear 152a of the lower flange unit 152, which faces toward the magnetic tape T, is tapered at an inclined angle of α. Accordingly, the more the magnetic tape T goes toward the outer periphery of the lower flange unit 152, the more the distance between the magnetic tape T and the edge 152a1 increases. As a result, it is possible to avoid the contact between the magnetic tape T and the gear 152a for regulating rotation, and to certainly prevent the magnetic tape T from being cut.

Next, details of the structure of the tape reel 150 of the present embodiment will be described.

In FIG. 5, a circular projection unit 152f engaging with a circular opening 103a formed on the lower shell 103 is formed at the center of the lower surface of the lower flange unit 152 of the tape reel 150.

The projection unit 152f has the chucking gear 152b in a ring-shape formed therein. This gear 152b engages with the gear 271a of the rotary shaft 270 (FIG. 11) provided in the tape drive 1 in a condition that the tape cartridge 100 is loaded in the cartridge loader unit 5 of the tape drive 1, and transmits the rotation of this rotary shaft to the tape reel 150.

Figure 9:
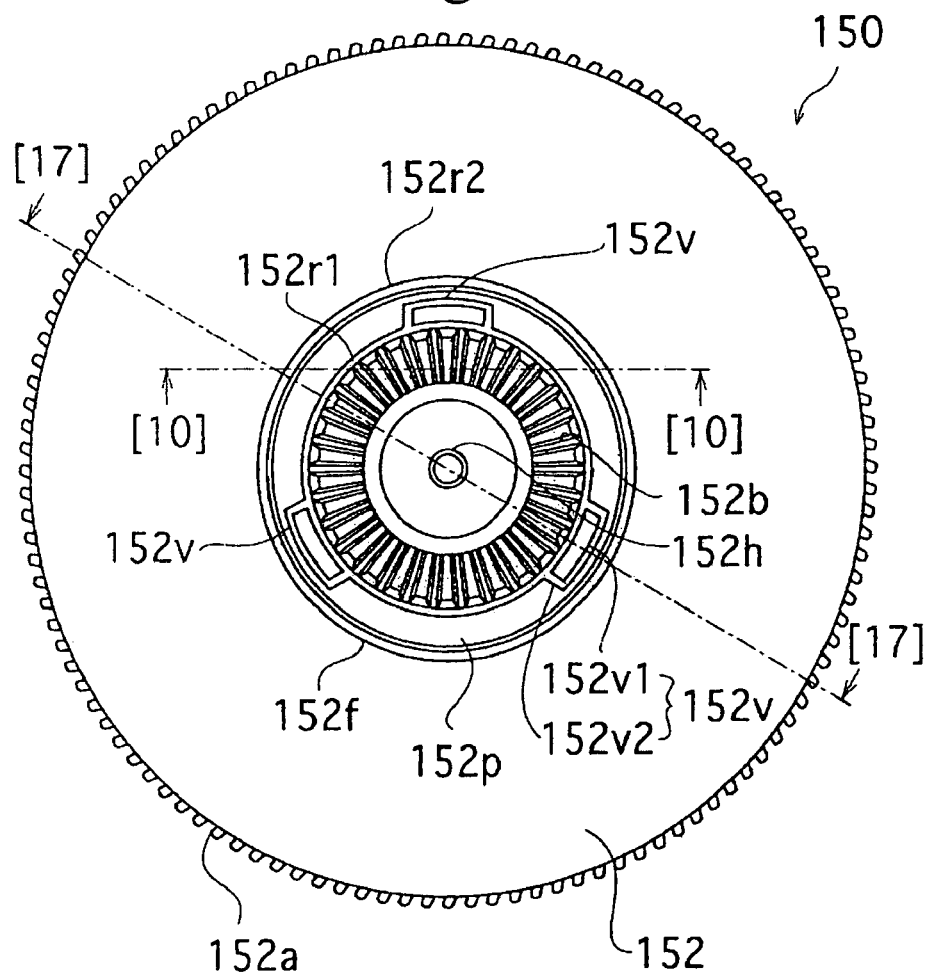
FIG. 9 is a bottom view of the tape reel 150.
Figure 10:
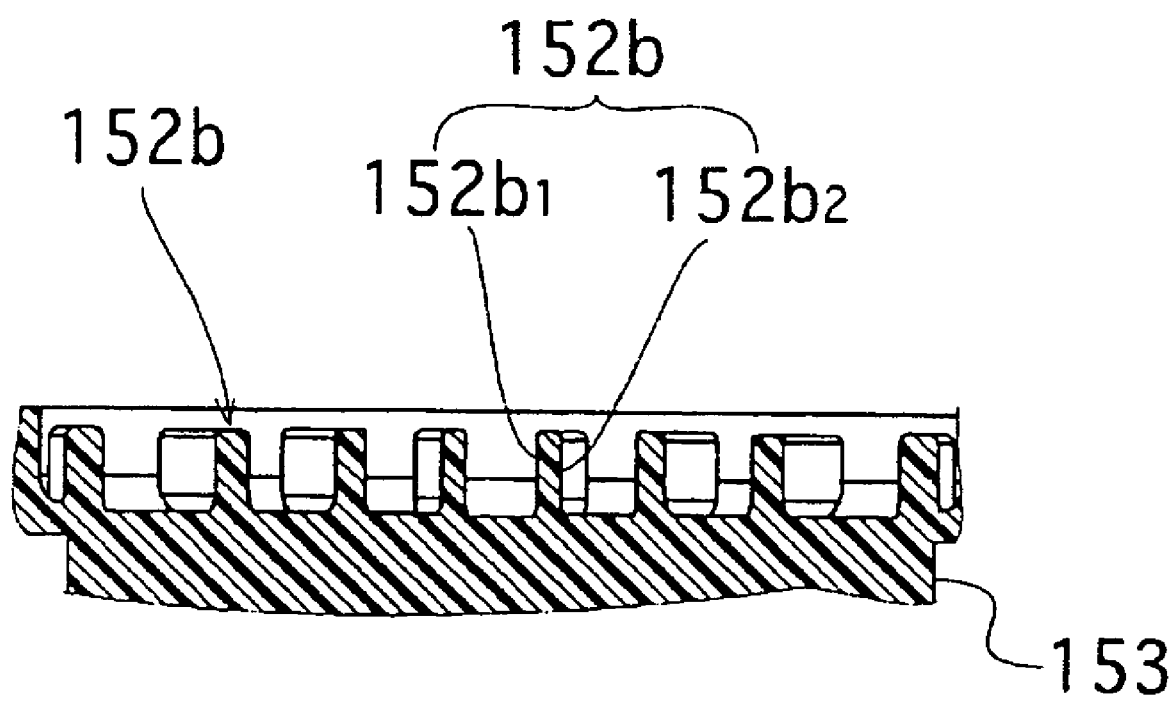
FIG. 10 is a cross-sectional view cutting along a line [10]—[10] in FIG. 9.

The structure of the chucking gear 152b formed on the under surface side of the lower flange unit 152 is shown in FIG. 9 and FIG. 10. FIG. 9 is a view showing the under surface of the lower flange unit 152, and FIG. 10 is a cross-sectional view cut along a line [10]—[10] in FIG. 9.

In the present embodiment, the number of teeth in the chucking gear 152b is thirty (30), which results in easy engagement between the tape reel 150 and the gear 271a of the rotary shaft 270 (FIG. 11). The chucking gear 152b has a pair of side faces 152b1 and 152b2 which are substantially vertical to an under surface of the tape reel, and the side faces 152b1 and 152b2 engage with the gear 271a of the rotary shaft 270 so as to prevent the tape reel 150 from idling.

In other words, when the engaging portion with the gear of the rotary shaft is made to be tapered (inclined), the tape reel may be idle along the tapered surface at the time of engagement, while, in the present embodiment, the engaging portion is constituted with the vertical walls so as to prevent the tape reel from being idling. Although the idling of the tape reel introduces tape cut at the time of taking out the tape from the cartridge and loosing of the tape at the time of taking up the tape, the construction of the present embodiment solves such problems. In addition, although in the case where the engaging portion is tapered, the tape reel may float along the tapered surface at the time of high-speed rotation, the present embodiment makes it possible to suppress the floatation of the tape reel.

Incidentally, because the side faces 152b1 and 152b2 of the chucking gear 152b are made to be substantially vertical to the under surface of the tape reel in order to suppress the floatation of the tape reel 150 against the rotary shaft 270 at the time the tape reel is rotated, the side faces 152b1 and 152b2 are not required to be exactly vertical but are only required to look vertical.

In addition, in the present embodiment, on the top surface of the lower flange unit 152, and at around the ring-like wall portion 152w to which the ball bearing 160 is press-fitted, there is formed a ring-like clearance 152y so as to suppress the generation of sink of resin on the under surface of the flange unit after molding.

On the other hand, with reference to FIG. 9, reference planes 152v are provided at an outer peripheral side of the chucking gear 152b on the same circumference at an interval of 120 degrees, for example, so that the supporting unit 271 at the point of the rotary shaft 270 abuts at three positions, for example, toward the bottom surface of the tape reel 150.

The reference plane 152v is formed at a ring-like recess (void) 152p formed between an inner peripheral rib 152r1 surrounding the chucking gear 152b and an outer peripheral rib 152r2 engaging the opening 103a of the lower shell 103. The reference plane 152v is, as shown in FIG. 9, provided separately from the outer peripheral rib 152r2.

Each of the plurality of reference planes 152v is formed with edge planes of each of a first rib 152v1 extending toward the circumference of the tape reel 150 and a second rib 152v2 extending toward a direction crossing with the first rib 152v1. The direction to which the second rib 152v2 extends can be suitably changed and the second rib 152v2 may be formed along the diameter direction.

And, the first rib 152v1 is formed narrower than the second 152v2, and, in the present embodiment, the first rib 152v1 is as wide as the inner peripheral rib 152r1.

In addition, a gate position 152h for the injection molding of the lower flange unit 152 is formed at the center of the lower flange unit 152.

As described above, the lower flange unit 152 of the present embodiment with which the reference plane is constituted takes, in accordance with the below-described reason, more measures than the above-mentioned conventional flange unit 52 (FIG. 20) to avoid occurrence of the sink at a top surface (tape guide plane) portion on the inner peripheral side of the lower flange unit 152 corresponding to the position where the projection portion 152f is formed.

Here, the reason why the reference plane 152v is designed mainly based on prevention of the sink at the lower flange unit 152 that the sink (recess) amount reflects on the surface wobbling at the tape reel rotation at the position and seriously affects on the stable runnability of the tape when the tape reel 150 rotates at a high speed.

In particular, since the lower flange unit 152 has the projection portion 152f on which the chucking gear, the reference plane or the like are formed and whose shape is extremely complicated, the edge of the magnetic tape wound around the drum unit 153 is affected in accordance with the sink amount after the molding, and the sink amount becomes a major factor damaging the straight runnability of the tape at the high speed running and the reliability in recording/reproducing operation.

Accordingly, in order to improve reliability of the magnetic tape at the time of high speed running, it is extremely meaningful to improve the molding quality of the tape reel and to reduce the surface wobbling thereof.

Figure 12A:
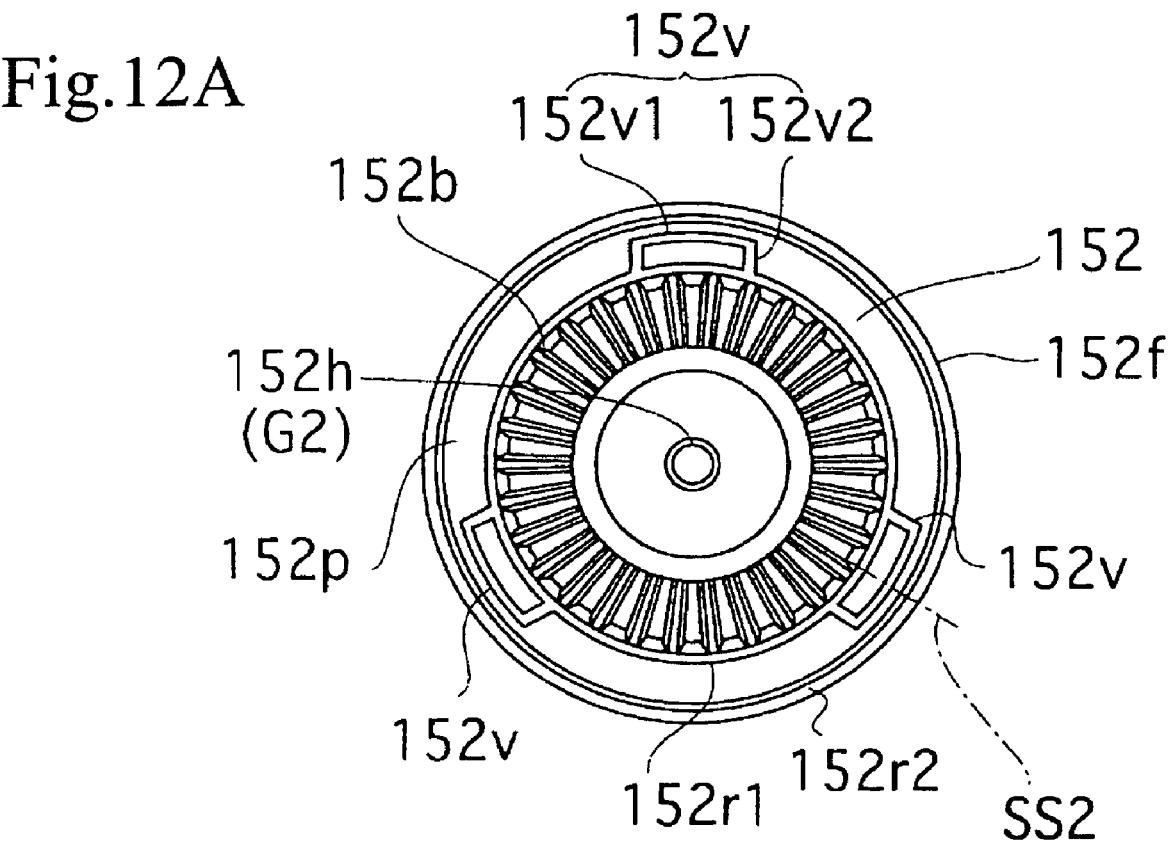
FIG. 12A is a bottom view of a main portion of the lower flange unit 152 of the tape reel 150.
Figure 12B:
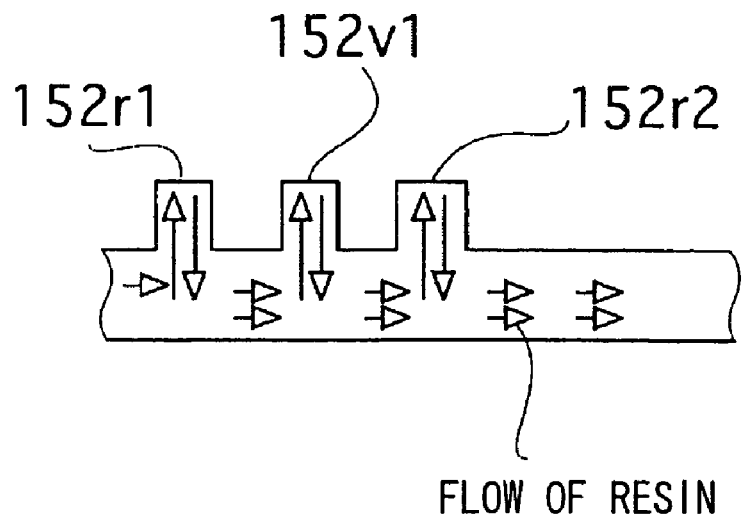
FIG. 12B is a schematic view explaining a flow of resin in the main portion at the time of molding.

FIG. 12B schematically show a flow of a resin at the time of molding at a position shown with a cross-sectional line SS2 in the reference plane 152v in FIG. 12A in which the figure of the projection portion 152f of the lower flange unit.

In the present embodiment, the reference plane 152v is formed separately from the outer peripheral rib 152r2, with the first rib 152v1 and the second rib 152v2, and, in addition, these ribs have a small volume, respectively. As a result, the volume of the portion constituting the reference plane 152v can be made less than the conventional one, and thus, the resin goes to all over the shape of the part while reducing the flow loss of the resin, and the sink hardly occurs after the resin is hardened.

In addition, since the gate position 152h (G2) for injection molding is provided at the center of the lower flange unit 152, without influence due to merging of resins, the resin goes all over evenly to contribute to an effect of reducing the surface wobbling at the inner peripheral side and the outer peripheral side of the flange.

Furthermore, although the first rib 152v1 constituting the reference plane 152v is formed substantially orthogonal to the flow of the resin, the homogeneous filling of the resin is ensured. It is conceivable that this is caused by the width of the first rib 152v1 formed narrower than the width of the second rib 152v2.

As described above, according to the present embodiment, the surface wobbling can be reduced than the conventional one, and the tape running stability at the time the tape reel rotates at the high speed can be improved.

In addition, according to the present embodiment, since the sink amount on the surface of the lower flange unit 152, on which the tape is wound, can be reduced more than that in the conventional one, the stress to the edge of the magnetic tape wound around the drum unit 153 is reduced to improve the reliability in recording/reproducing operation.

(Second Embodiment)

Next, the second embodiment of the present invention will be described with reference to FIG. 13 and FIGS. 14A to 14C.

Figure 13:
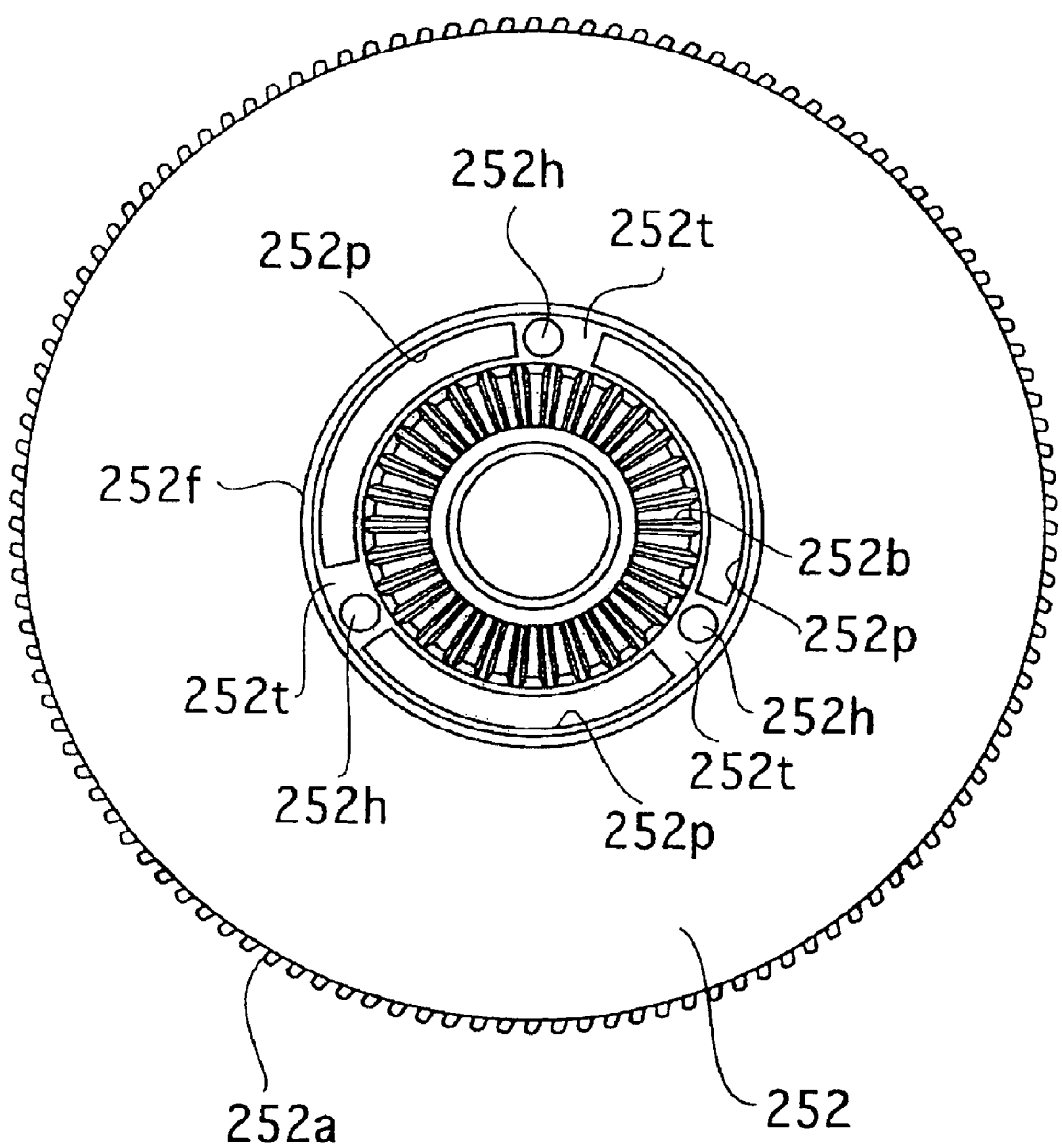
FIG. 13 is a bottom view of a lower flange unit 252 of a tape reel according to a second embodiment of the present invention.
Figure 14A:
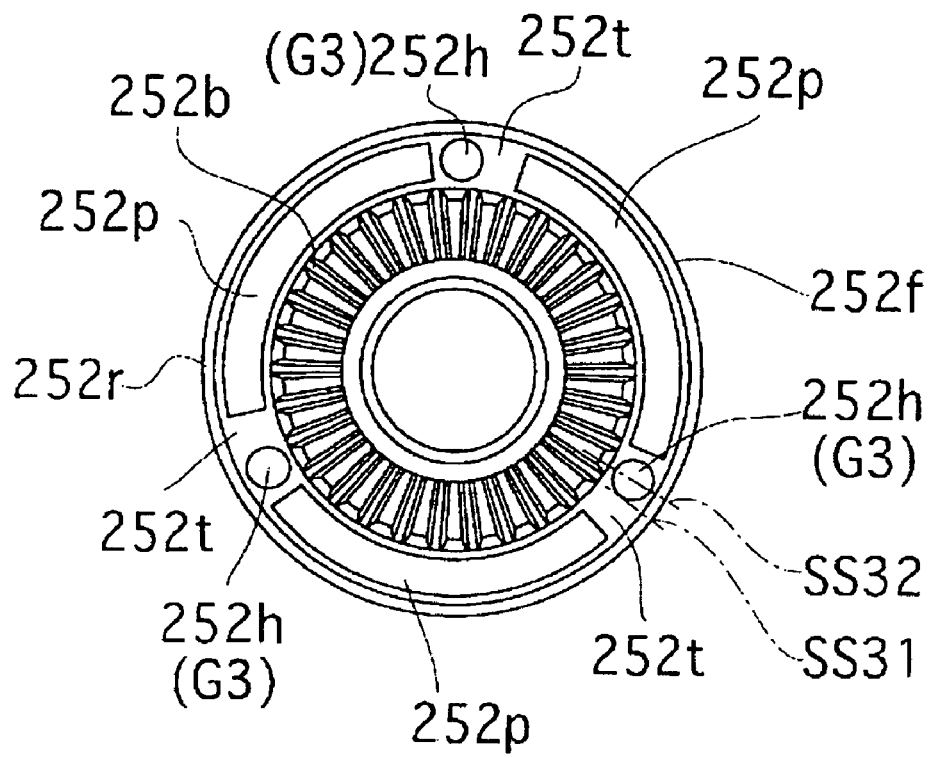
FIG. 14A is a bottom view of a main portion of the lower flange unit 252.
Figure 14B:
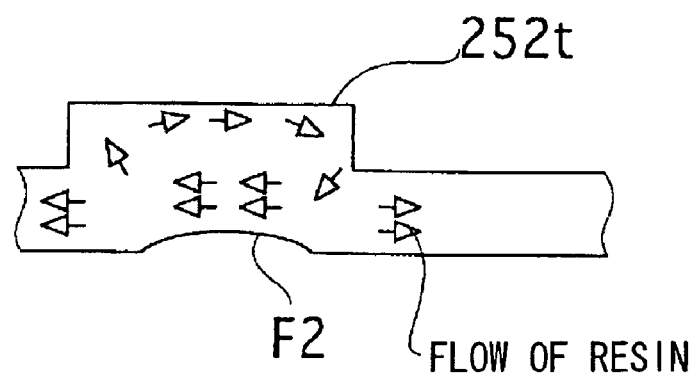
FIG. 14B to FIG. 14C are schematic views explaining a flow of resin in the main portion at the time of molding.
Figure 14C:
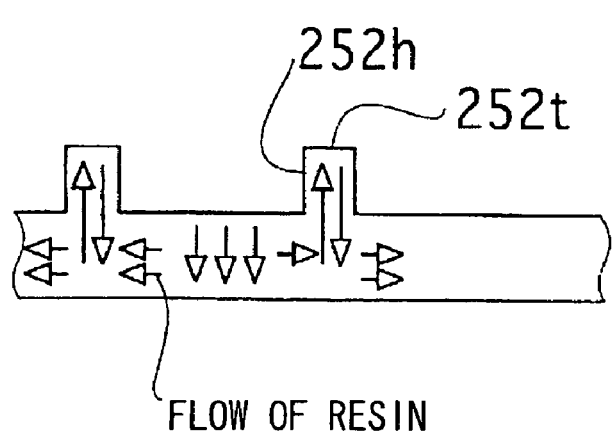

Here, FIG. 13 is a bottom view of a lower flange unit 252 constituting a tape reel of the present embodiment. In addition, FIG. 14A shows the shape of a projection portion 252f of the lower flange unit 252, and FIG. 14B and FIG. 14C schematically show a flow of the resin at the time of molding at positions shown with cross-sectional lines SS31 and SS32, respectively.

A circular projection portion 252f engaging with a circular opening formed on an under shell is provided at the center of the lower surface of the lower flange unit 252 of the present embodiment.

The projection portion 252f has a ring-like chucking gear 252b formed thereto. This gear 252b engages with the gear of a rotary shaft provided to a tape drive in a condition that a tape cartridge is loaded in a cartridge loader unit of the tape drive, and transmit the rotation of the rotary shaft to the reel.

In addition, reference planes 252t are provided at an outer peripheral side of the chucking gear 252b on the same circumference at an interval of 120 degrees, for example, so that a supporting unit at the point of the rotary shaft on the side of the tape drive abuts at three positions, for example. Although the reference plane 252t as shown in the figure is formed continuously to an outer peripheral portion 252r engaging with a circular opening of a lower shell, but the present invention is not limited to this arrangement. Areas other than the reference planes 252t are provided with voids 252p.

In the present embodiment, a gate position 252h for injection molding is positioned inside each of the reference planes 252t, and thus, the sink in the reference plane 252t is to be prevented from occurring at the time of molding. In FIG. 13, the gate position 252h is set closer to the side of the reference plane 252t, in order to ensure a continuous contact area between the reference plane 252t and the rotary shaft sufficiently. Depending on the size of the reference plane 252t, the gate position 252h may be provided at the center of the aforementioned reference plane.

Figure 21A:
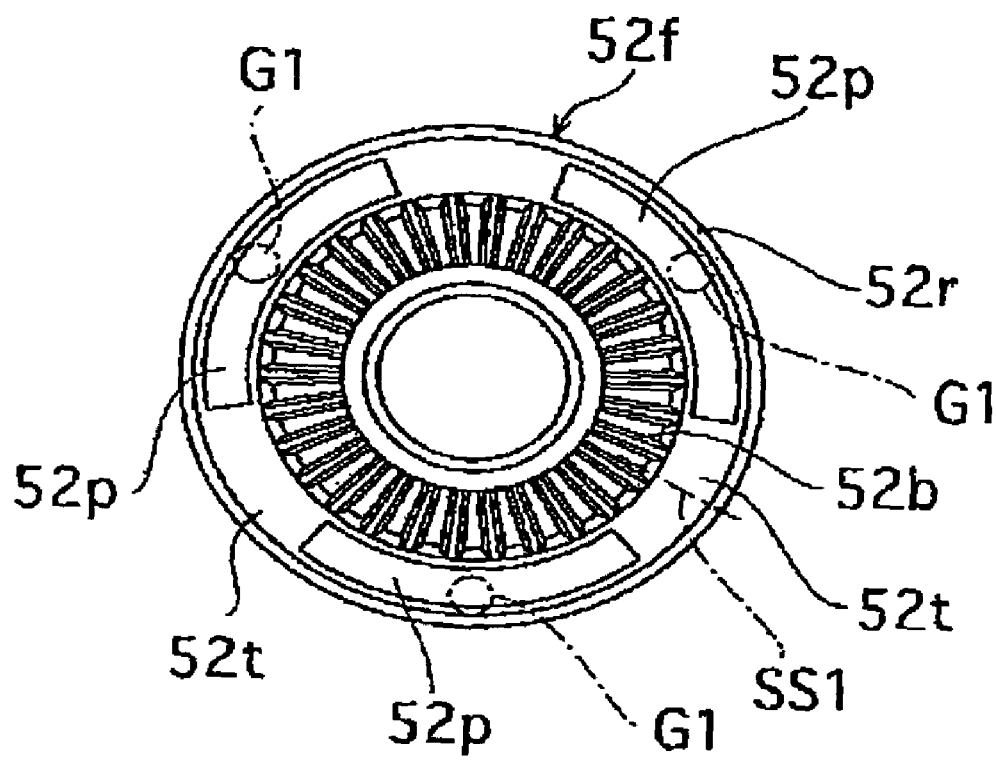
FIG. 21A is a bottom view of a main portion of a lower flange unit 52 of the tape reel 50.
Figure 21B:
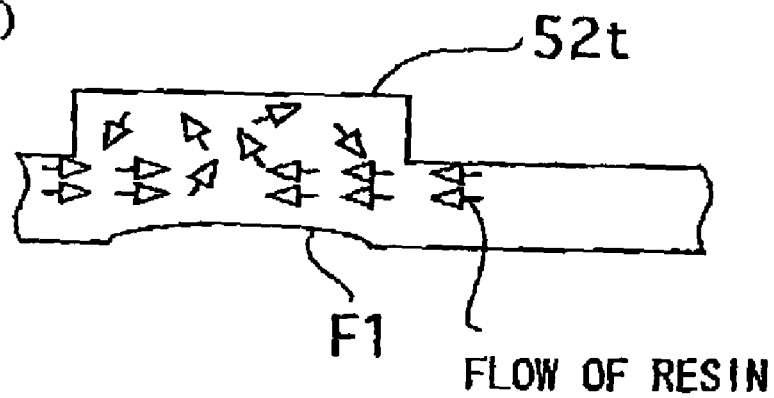
FIG. 21B is a schematic view explaining a flow of resin in the main portion at the time of molding.

In the present embodiment, as shown in FIG. 14A, since the gate position 252h (G3) for injection molding is provided inside the reference plane 252t, the volume of the reference plane 252t is less than that of the conventional reference plane 52t (FIG. 21A) and the injection pressure sufficiently works so that the sink F2 occurred after the resin is hardened is smaller than that of the conventional one, as shown in FIG. 14B.

In addition, as shown in FIG. 14C, the resin is sufficiently spread all over the heavy-walled area in the gate position G3, the sink is hardly occurred after the resin is hardened.

Therefore, according to the present embodiment, similar effect to that of the above-described first embodiment can also be achieved, and it is possible to suppress the surface wobbling at the flange unit and to ensure the straight runnability of the magnetic tape and the reliability in recording/reproducing operation.

Explanation of the present embodiment will follow.

Figure 20:
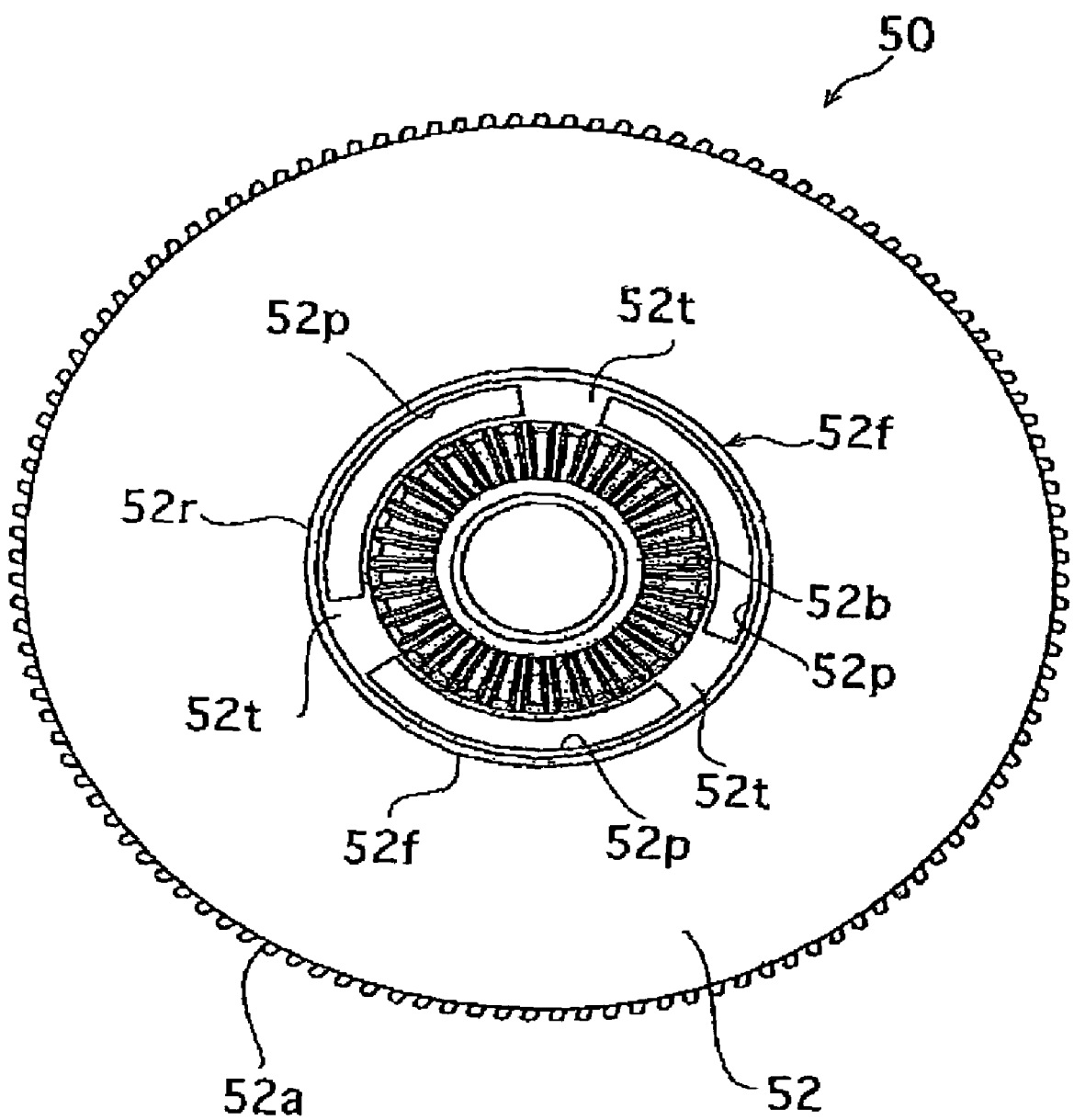
FIG. 20 is a bottom view of a conventional tape reel 50.

With regard to the difference in mold quality resulting from the constitution of the reference plane, each of the lower flange unit 52 (sample 1 (comparative example)) having the conventional reference plane 52t as shown in FIG. 20, the lower flange unit 252 (sample 2 (embodiment 2)) having the reference plane 252t of the second embodiment as shown in FIG. 13, and the lower flange unit 152 (sample 3 (embodiment 1)) having the reference plane 152v of the first embodiment as shown in FIG. 9 was studied.

Incidentally, the samples 1–3 are made of the same resin material (in the present example, polycarbonate resin containing glass fiber), the size in design and the molding condition of the common structural elements are the same.

Figure 15:
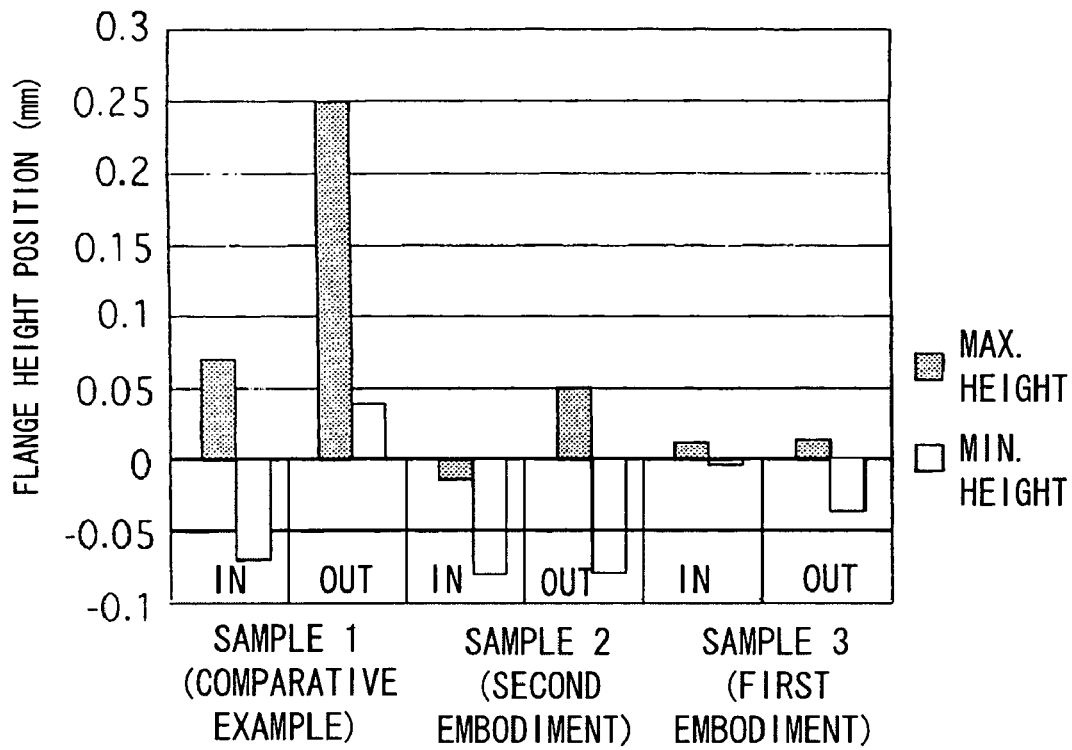
FIG. 15 is a view showing measurement results of each of flange height of a lower flange unit (sample 1) of the conventional tape reel, the lower flange units 252 (sample 2), 152 (sample 3) of the tape reel of the present invention.
Figure 16:
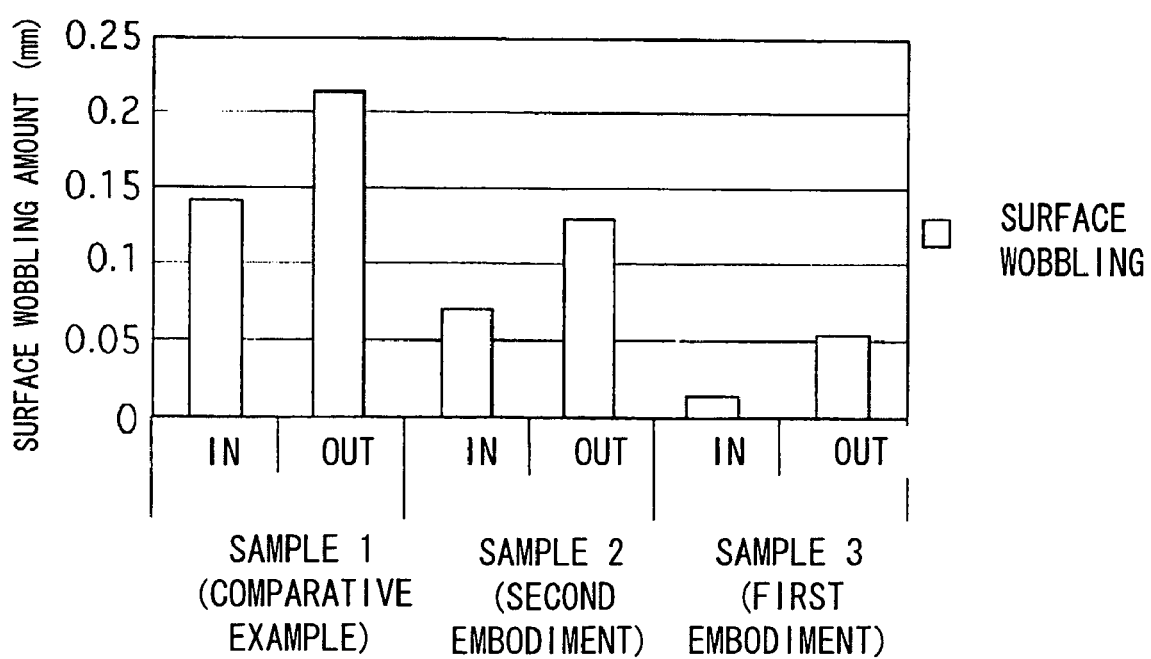
FIG. 16 is a view showing measurement results of surface wobbling amount of each of the lower flange unit of the samples 1–3.

FIG. 15 is a view showing fluctuation in height of the flange unit of each of the samples 1–3, and the height fluctuation of the inner peripheral side and the outer peripheral side of the flange unit are shown in the figure. In addition, FIG. 16 shows the amount of surface wobbling at each point of the inner peripheral side and the outer peripheral side of the samples 1–3. The amount of surface wobbling is a value obtained by subtracting the minimum value of the height fluctuation from the maximum value thereof shown in FIG. 15.

Figure 17:
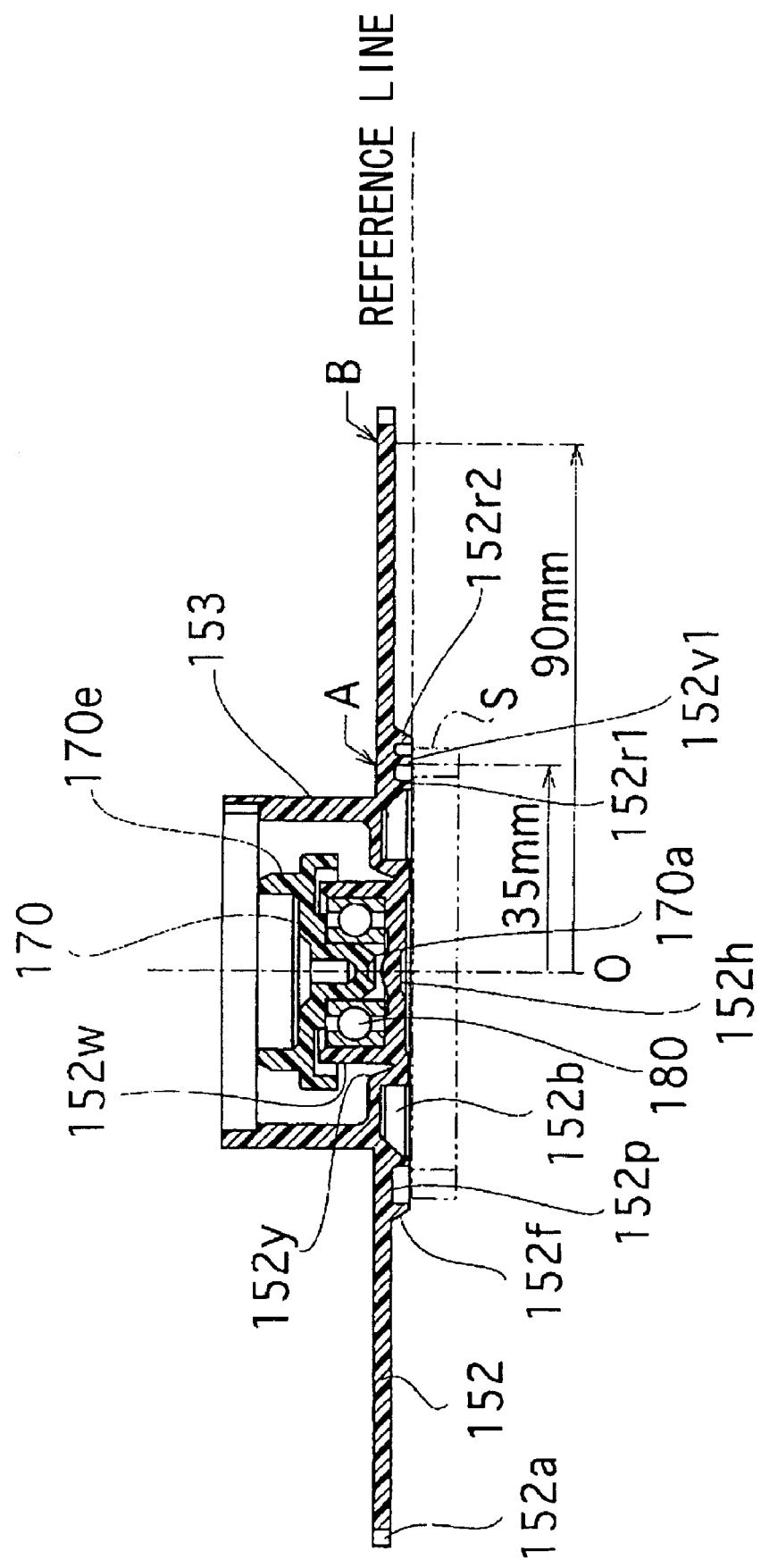
FIG. 17 is a cross-sectional view cutting along a line [17]—[17] in FIG. 9.

As a measuring method, as shown in FIG. 17, a surface wobbling measurement reference step S is provided on the reference plane of each sample, and the height fluctuation in a point A (inner peripheral side) and a point B (outer peripheral side) at the time when the tape reel is rotated once was measured. Here, a reel diameter of each sample is 96 mm, and a point A and a point B show points 35 mm and 90 mm away from the center O, respectively.

As apparent from FIGS. 15 and 16, in the order of sample 1, sample 2, sample 3, the flange height variation, that is, the surface wobbling amount becomes smaller at both the inner peripheral side and the outer peripheral side.

The amount of the surface wobbling largely affects the size of the sink on the tape-winding surface of the flange after the molding.

Figure 18A:
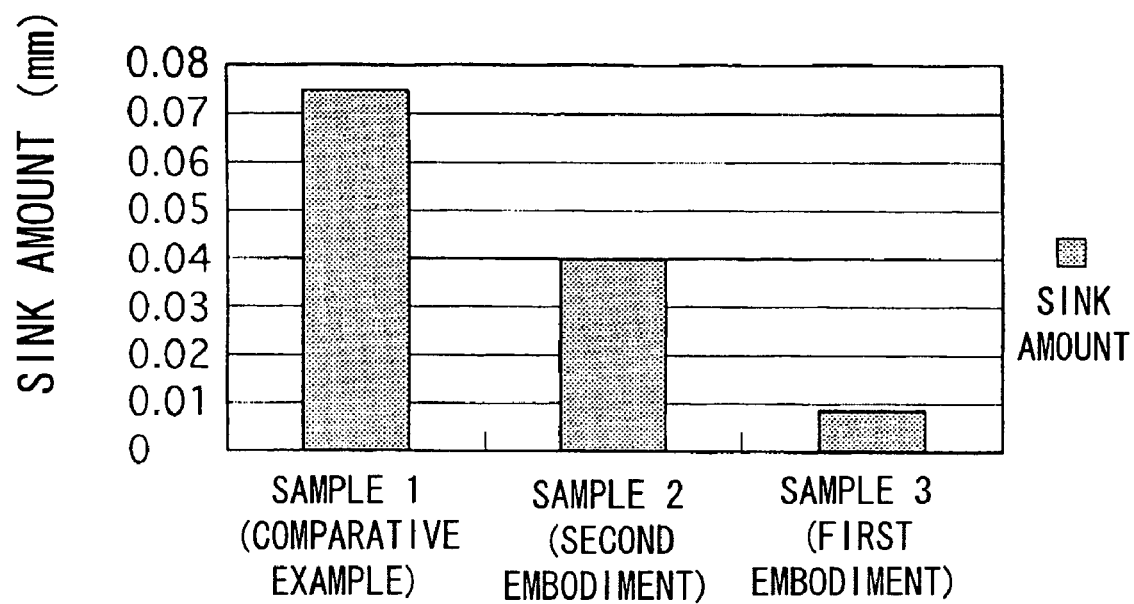
FIG. 18A shows measurement results of the sink amount at an arbitrary position of each lower flange unit of the samples 1–3.
Figure 18B:
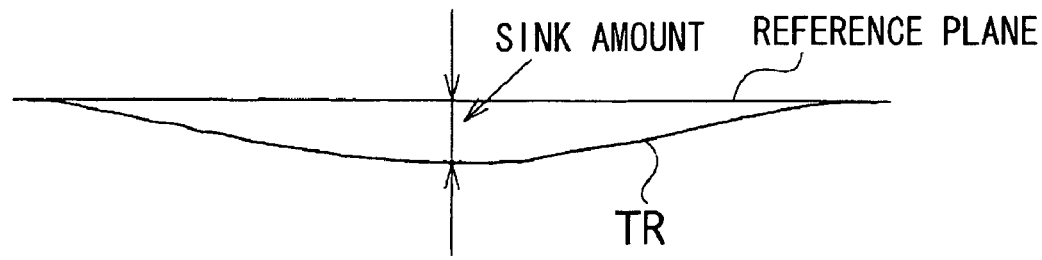
FIG. 18B is a schematic view for explaining the definition of the amount of the sink.
Figure 19:
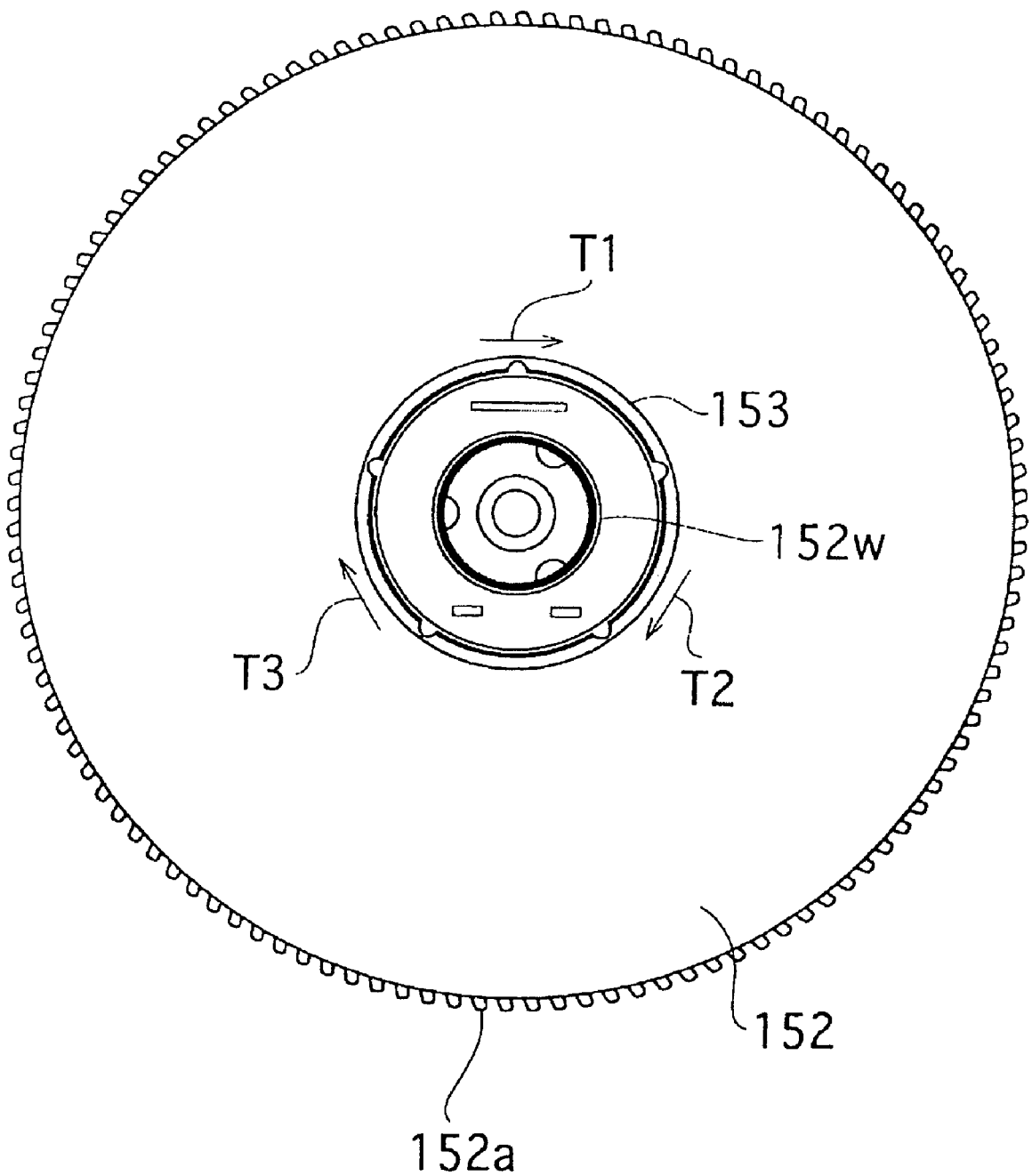
FIG. 19 is a top view of the lower flange unit showing a measurement position of the sink amount shown in FIG. 18A to FIG. 18B.

FIG. 18A is a view showing the sink amount on the flange plane side of the magnetic tape winding surface side facing to the reference plane in the thickness direction, and show the maximum values at three arbitral positions on the flange plane at the time of shape tracing along arrows T1, T2 and T3 which are orthogonal in a diameter direction as shown in FIG. 19. The sink amount is expressed with the distance between the deepest point of the trace line TR and the reference plane as shown in FIG. 18B.

As apparent from FIG. 18A, in the order of the sample 1, the sample 2, the sample 3, the flange height variation, that is, the surface wobbling amount becomes smaller, and in particular, with regard to the sample 3 (embodiment 1) corresponding to the lower flange unit 152 of the first embodiment of the present invention, the sink amount is sharply decreased in comparison with the sample 1, and the size of the sink is improved to be 0.01 mm or less, which is not generally called "sink".

Incidentally, the measurement result shows that the sink amount depends on the difference of the shape of each reference plane of samples 1–3, however, it is conceivable that the gate position for the injection molding supplements the reduction effect on the sink amount.

Although each embodiment of the present invention has been explained in the above description, the present invention is not limited thereto and various modifications in accordance with the technical idea of the present invention may also be possible.

For example, in each of the above-described embodiments, although the tape cartridge in the mode including the leader block is explained as an example, the tape reel according to the present invention is not limited to the tape reel for such mode of the tape cartridge, but may be applicable to a tape reel for a tape cartridge of a mode without the leader block.

In this case, the present invention is applicable not only to a tape reel for a single reel type tape cartridge but also to each of tape reels of a tape cartridge accommodating a pair of tape reels.

As described above, according to the present invention, it is possible to reduce the surface wobbling amount of the flange unit by improving the molding quality of the tape reel, and the straight runnability of the magnetic tape at the time of high-speed rotation and reliability in data recording/reproducing operation can be ensured.

The invention claimed is:

1. A tape reel having a pair of flange units guiding a tape from both sides thereof, provided with a chucking gear formed at a center of an under surface thereof in a ring-shape, which engages with a gear unit formed at a top end of a rotary shaft provided in a tape drive device, said tape reel is characterized by comprising:

an annular outer peripheral rib formed at an outer peripheral side of said chucking gear and engages with a circular opening formed on an under surface of a housing accommodating said tape reel to be freely rotatable; and a plurality of reference planes each of which is formed between said chucking gear and said outer peripheral rib and supported by a reel support unit on a side of said rotary shaft, wherein said reference plane is provided separately from said outer peripheral rib, and wherein each of said plurality of reference planes is formed with each end surface of a first rib extending toward a circumference of said tape reel and a second rib extending in a direction crossing with said first rib.

2. The tape reel as claimed in claim 1, characterized in that said first rib is formed to have a narrower width than said second rib.

* * * * *